CONVERTING APPARATUS

Filed Dec. 16, 1958 2 Sheets-Sheet 1

INVENTOR.
MORDECHAI MONTAG
BY
[signature]
ATTORNEY

INVENTOR.
MORDECHAI MONTAG
BY [signature]
ATTORNEY

United States Patent Office 3,076,071
Patented Jan. 29, 1963

3,076,071

CONVERTING APPARATUS

Mordechai Montag, Brooklyn, N.Y.
(3 Malton Road, Plainview, N.Y.)

Filed Dec. 16, 1958, Ser. No. 780,884
7 Claims. (Cl. 200—67)

This invention relates to apparatus for converting one form of energy, power, force and the like into two or more forms of the same, and more particularly to devices which respond differently to sequential applications of control forces which may be identical.

There are numerous devices which can employ converting apparatus of the type contemplated by the invention. For example, a single-pole double-throw switch as employed in electrical equipment may desirably be provided with a single actuator having but a single type of control action which must therefore be converted into a multiple-throw action. Similarly, an off-on switch provided with a single-action control must be provided with converting apparatus in order that the action of the control can alternately open and close a circuit or open and close two electrical or mechanical circuits alternately.

Furthermore, in data processing structures or in any field employing counting devices, there is a need for apparatus which responds to sequential applications of like forces to manifest either of two conditions consecutively and alternatively. Converting devices of the invention fulfill this need. Similarly, the invention will find application in connection with valve controls.

As indicated above, it is a primary object of the invention to provide improved means which respond to the sequential application of like forces by performing different operations, assuming different positions, manifesting different conditions or the like.

For example, with reference to switches, it is an object of the invention to provide improved apparatus for making and breaking a contact in response to a sequence of similarly applied control forces. With respect to counting devices, it is an object of the invention to provide improved apparatus which alternatingly and consecutively exhibits either of two conditions as, for example, is employed in connection with the binary code.

The above indicated objects of the invention are by no means all inclusive. Thus, for example, it is a further object of the invention to provide its improvements in a manner which employs a minimum of components beyond those which are required in conventional devices.

Furthermore, it is an object of the invention to provide its advantages while at the same time providing structures which require a minimum of space and which are capable of being manufactured very economically.

As a feature of the invention, there are employed parts which are readily fabricated such as by stamping and like simple operations. Advantageously, these parts are incorporated into structures wherein a very small displacement or movement of the parts is required. Accordingly, the parts wear very well and need not be made of the best materials. Furthermore, these parts may be of comparatively simple design.

To achieve the above and other of its objectives, the invention contemplates the use of an actuating mechanism and an operating member which may be conventional elements per se. However, between these elements is positioned a means which is capable of assuming one of a plurality of predetermined relationships with respect to the operating member. Each of these relationships establishes a different reaction of the operating member to a control force exerted through the actuating mechanism and this is so despite the fact that sequentially applied forces may be alike and even identical.

In further accordance with the invention, apparatus is provided to control automatically the above-noted means. This apparatus may be, for example, an energy storage device which stores energy in response to the operation of the actuating mechanism and which uses this stored energy to control said means. A very simple storage device such as a spring can be employed.

To enable a practicing of the invention, a detailed description of preferred structures thereof follows. The description, which will moreover disclose other features and advantages of the invention, is illustrated in the accompanying drawing in which.

Figure 1:
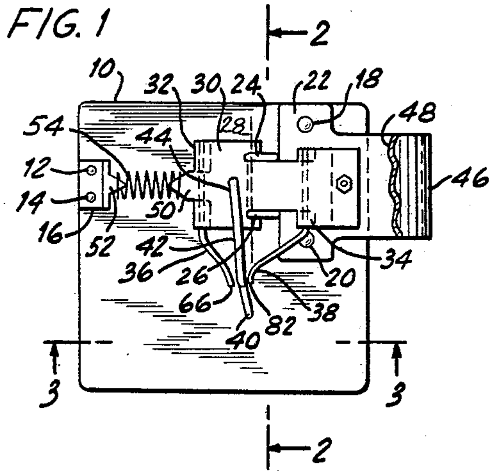
FIGURE 1 is a top plan view of a converter in the form of an electrical switch as provided for in accordance with one embodiment of the invention.
Figure 2:
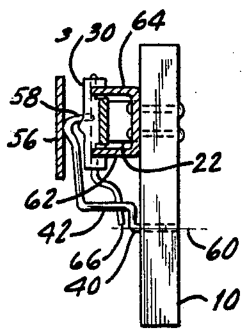
FIGURE 2 is an end view of the switch of FIGURE 1, a portion of the structure being shown in section along line II—II of FIGURE 1.
Figure 3:
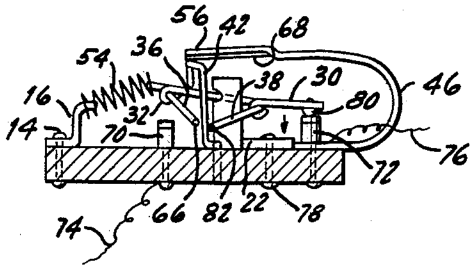
FIGURE 3 is a side view of the switch of FIGURE 1.

The apparatus illustrated in FIGURES 1–3 is a mechanical device adapted for receiving a sequence of like actuating forces and for responding to the same by alternately performing two different functions. In this sense, the apparatus may be considered as being a binary counter which exhibits either of two conditions in accordance with an actuating force applied thereto.

More particularly, FIGURES 1–3 illustrate apparatus embodying the invention in the form of an electric switch. This switch may be, for example, an off-on switch which closes and opens an electrical circuit in accordance with the sequential operation of its actuator.

In FIGURE 1 is illustrated a base plate 10 upon which is mounted, by means of rivets 12 and 14, a flanged member 16. Also supported on the plate 10 by means of rivets 18 and 20 is a plate 22. The plate 22 supports a pair of spaced bearings 24 and 26 which are coaxially aligned and which rotatably support a pivot diagrammatically indicated by an axis 28 upon which is mounted a lever 30.

The lever 30 is divided by the pivot 28 into two lever arms. These lever arms are respectively provided with clamping portions 32 and 34, which extend generally in parallel with the pivot 28. In the clamping portion 32 is supported an arm 36, which extends laterally but angularly away from the lever 30. Similarly, the clamping portion 34 supports an arm 38, which extends laterally but angularly from the lever 30. Arms 36 and 38 converge towards each other at a zone which is spaced from the lever 30. The arms 36 and 38 are of a resilient material, such as beryllium copper, plastic, and so forth and serve the purpose of storing energy, as will be explained hereafter.

Pivoted in the base plate 10 at 40 is a member 42. The member 42 is sandwiched between the free extremities of the arms 36 and 38. The upper portion 44 of the member 42 is, as will be shown, interposed selectively between the lever 30 and a portion of the actuator or control 46, a portion of which has been broken away in FIG. 1 as at 48, in order not to obscure a view of the other elements of the switch.

The leftmost extremity of the lever 30 in FIGURE 1 is formed in the shape of a pointed extension 50. Similarly, a pointed extension 52 is provided on the flanged member 16. Extending between extensions 50 and 52 is a spring 54. Spring 54 acts under compression and is a dead-center spring, which functions to urge the lever 30 selectively into either of two extreme positions, as will be explained in greater detail hereinafter.

FIGURE 2 illustrates the portion 56 of the actuator 46, which is broken away in FIGURE 1. This figure clearly illustrates how a portion 58 of the interposed member 42 is sandwiched between the portion 56 of the actuator 46 and the lever 30.

FIGURE 2 also illustrates clearly the pivot portion 40 of the interposed member 42, as well as the manner in which pivot portion 40 is perpendicularly accommodated by the base plate 10 for pivotal movement around an axis of rotation 60.

The plate 22 is provided with upwardly extending vertical members 62 and 64 at the top of which are provided the bearings 24 and 26, which pivotally support the lever 30, as aforesaid.

FIGURE 2 additionally illustrates the engagement or position of the free end 66 of arm 36 relative to the interposed member 42.

In FIGURE 3, the actuator 46 is shown in full side view and attention is directed to the fact that the actuator 46 is illustrated in the form of a U-member which may be made, for example, of a resilient material such as beryllium copper, plastic and so forth. The actuator 46 may be provided beneath its portion 56 with a sheet 68 of insulating material. This sheet may be, for example, a plastic which is cemented or otherwise bonded in position.

The apparatus further includes two members 70 and 72. Member 70 may constitute an electrical terminal to which is connected an electrical line 74. Member 72 may simply be a post but alternatively may be an electrical contact so that the switch becomes a single-pole double-throw switch.

For purposes of providing an off-on switch, the other line 76 of the electrical circuit may be connected to the plate 22 by means of rivet 78. The lever 30 therefore constitutes part of the electrical circuit and is an actuable means adapted for performing two functions; i.e., making contact with members 70 and 72 respectively.

In FIGURE 3, lever 30 is provided with a contact 80 which, if the post 72 has no electrical connection thereto, serves merely as an abutment member for engaging the post. The other lever arm of the lever 30 may similarly be provided with a contact but alternatively the clamping portion 32, which is in the form of a knurl, may serve the dual function of clamping arm 36 and constituting a contact for engaging member 70.

The lever 30 is illustrated in FIGURE 3 as being pivoted in a clockwise manner with contact 80 in engagement with post 72. This moves the outermost extremity of the opposite lever arm to its uppermost position whereupon, as illustrated, the spring 54 assumes a position above its dead center. Accordingly, the lever 30 is maintained in the illustrated position. If, however, the left lever arm of the lever 30, as indicated in FIGURE 3, were to be depressed, spring 54 would operate to maintain this latter condition.

Arms 36 and 38, aside from being resilient members, are clamped rigidly to the lever 30. They thus partake of the movement of the lever 30 and effect no other movement than as may be caused by their own deformation. Free end 66 of arm 36 is preferably so spaced from free end 82 of arm 38 that only one of these free ends makes contact with interposed member 42 at a given time. These elements constitute a converter means as will be seen.

Figure 4:
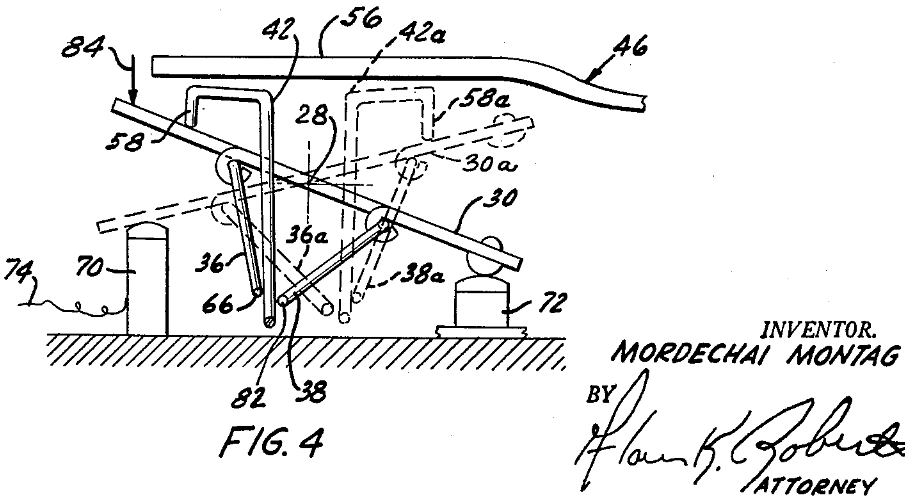
FIGURE 4 illustrates diagrammatically the movement of the various components of the structures illustrated in FIGURES 1–3.

Reference will next be made to FIGURE 4 to explain the operation of the apparatus which has been described above. Briefly, in FIGURE 4 are illustrated the portion 56 of the actuator 46, post 70 and post 72. Further illustrated are the lever 30, arms 36 and 38 and interposed member 42.

The interposed member 42 is controllably pivotal from the position shown by solid lines to the position 42*a* shown in dotted lines. Lever 30 is pivotal about pivot 28 from one extreme position indicated by solid lines to position 30*a* indicated by dotted lines. Arms 36 and 38 which partake of the movement of the lever 30 are thus transported from their respective positions shown in solid lines to the positions respectively indicated at 36*a* and 38*a* by the use of dotted lines. The movement of the arms 36 and 38 between their respective positions controls the pivoting of interposed member 42.

Assuming the interposed member 42 to be in the position indicated by solid lines, a movement of the actuator 46 in the direction indicated by arrow 84 will operate through portion 58 of interposed member 42 to pivot lever 30 counter-clockwise to the position indicated at 30*a*. Lever 30*a* will therefore engage post 70 and will thus connect line 74 to any electrical line connected to the lever.

During this operation, the arm 36 will tend to assume its position 36*a*. This, however, will be immediately impossible, inasmuch as the actuator 46 is holding interposed member 42 against lever 30, whereupon rotation of the interposed member 42 about its pivot 40 (see FIGURES 1–3) will be prevented.

The next natural operation of the actuator 46 is the release thereof, so that the portion 56 of the actuator moves upwards in a direction which is opposite to that of arrow 84. The deformation of arm 36 which results when a pivoting of interposed member 32 is prevented causes a storing of potential energy in that arm. When the actuator 46 is released, the arm 36 springs back to its natural form and assumes the position 36*a*. This causes the interposer 42 to be pivoted to 42*a* and, as a result, portion 58 of the interposed member 42 assumes position 58*a*. When this latter movement occurs, the interposed member is no longer situated between the actuator 46 and the left lever arm of lever 30, but is instead effectively interposed between the actuator 46 and the right lever arm of lever 30. The next sequential depression of actuator 46 will therefore cause a clockwise pivoting of lever 30, rather than a counter-clockwise pivoting.

The operation indicated above is reversed on the next sequential operation of the actuator. Arm 38 tends to be deformed to store potential energy and releases this potential energy to assume position 38*a* on a release of actuator 46 after the latter has been released. Portion 58 leaves position 58*a* and resumes the position indicated by solid lines, the cycle having been completed.

The structure which has been provided therefore constitutes a switch which responds to identical displacements of the actuator 46 for sequentially performing alternate operations; i.e., the switch first closes a circuit in response to an operation of the actuator 46 and then opens the circuit in response to the next identical operation of the actuator 46. This result is achieved by priming the interposed member 42 and this priming is in turn effected by the storing of energy in or the deformation of arms 36 and 38 which thereby constitute energy storage devices.

The above described embodiment of the invention is intended to be illustrative of one form which apparatus of the invention may assume. A second illustrative form is illustrated in FIGURES 5 and 6.

Figure 5:
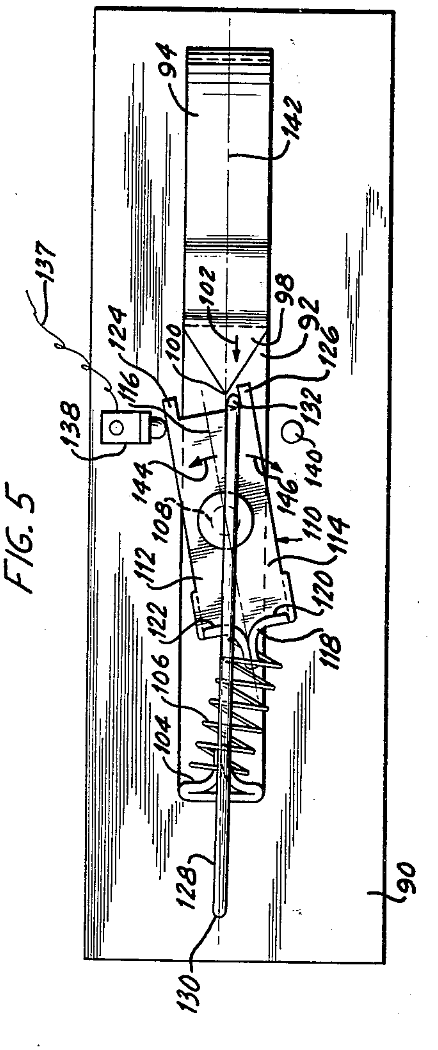
FIGURE 5 illustrates a further embodiment of the invention in top plan view.
Figure 6:
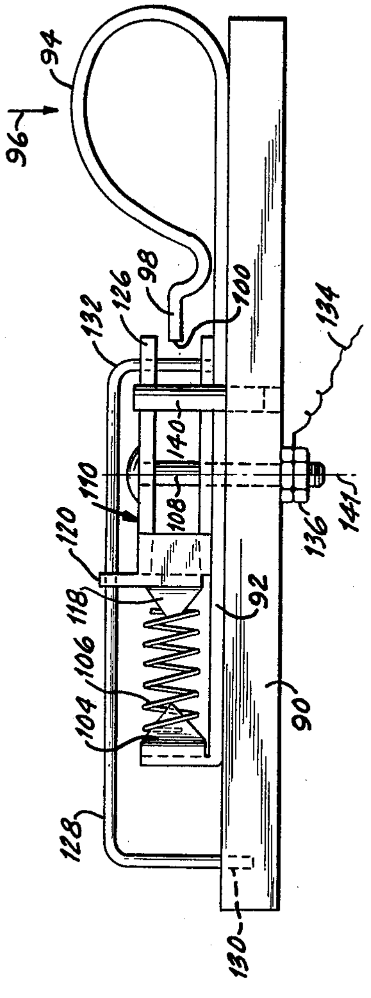
FIGURE 6 is a side view of the structure shown in FIGURE 5.

In FIGURES 5 and 6 is illustrated a base plate 90. Base plate 90 supports a metallic strip 92, one end of which is formed as an actuator 94 adapted for being depressed in the direction indicated by arrow 96. Actuator 94 is provided with a wedge-shaped member 98 which tapers to a point 100, the wedge 98 being displaced in the direction of arrow 102 when the actuator 94 is depressed.

The other end of strip 92 is formed as a support 104 which is adapted to accommodate one end of a dead-center spring 106, the function of which is the same as the spring discussed above with respect to FIGURES 1–3.

Pivoted on the base plate 90 and thus on the strip 92 by means of a pivot 108 is a lever 110. Lever 110 may be considered as having two lever arms respectively to the left and to the right of the pivot 108 in the drawing, but may as well be considered as having lever arms 112 and 114, above and below the center line 116, illustrated in FIGURE 5.

One extremity of the lever 110 is provided in the form of a support 118, which is inserted within the spring 106. The spring 106 is therefore effective to maintain the lever 110 in either of two extreme positions.

The same extremity of lever 110 is provided with two vertically extending arms 120 and 122, the function of which will become hereinafter apparent.

The opposite extremity of lever 110 is provided with arms 124 and 126. These arms cooperatively define a bracket, the purpose of which is to be explained in greater detail.

Supported on the base plate 90, is a cantilever spring 128 made of a resilient material such as beryllium copper. The end 130 of the spring is fixed in the base plate 90 in such a manner that the spring is fixed against pivotal motion and therefore must rely on its own deformation for movement. The spring 128 extends along and above the lever 110. Free end 132 of this spring extends downwardly between arms 124 and 126, which constitute a bracket therefor. Only one of these latter arms is in engagement with the free end 132 at a time.

An electrical line 134 may be connected to the pivot 108 by means of an arrangement such as illustrated by nuts 136. This effectively connects line 134 to the lever 110. A second line 137 is connected, for example, to a contact 138 which is fixed in position to one side of the lever 110.

At the other side of lever 110 is positioned a post 140. In the illustrated embodiment, post 140 is simply a stationary member supported by base plate 90. It will be appreciated that this post may be used as a part of an electrical circuit, if desired.

Contact 138 and post 140 are spaced by a distance which exceeds the width of lever 110. The lever 110 may therefore pivot about the pivot 108.

The central axis 141 of the pivot 108 and the point 100 of the wedge 98 define therebetween a straight line 142. This straight line not only corresponds to the dead center position of spring 106, but moreover has a relationship with spring 128 as will next be explained.

Wedge 98 is not intended to engage the lever 110 directly. In fact, as illustrated in FIGURE 6, the wedge 98 is so positioned as to engage only the free end 132 of the spring 128. The free end 132 will therefore be displaced either in the direction of arrow 144 or in the direction of arrow 146 in accordance with the position assumed by free end 132 relative to line 142 prior to a movement of wedge 98 in the direction of arrow 102.

The position which free end 132 assumes is directly controlled by arms 120 and 122, which are supported as noted above on the lever 110. For example, with the lever pivoted counterclockwise, as illustrated, arm 122 bears against spring 128 and moves free end 132 to the illustrated position for engagement by wedge 98. Wedge 98 moving in the direction of arrow 102 will then urge free end 132 in the direction of arrow 146, whereupon engagement of the free end with arm 126 of lever 110 will move lever 110 in clockwise direction.

Upon a pivoting of lever 110 in clockwise direction, arm 120 will bear against spring 128 and will tend to urge free end 132 towards the opposite side of line 142. This motion will, however, be prevented by the interference of wedge 98 until actuator 94 has been released and the wedge assumes its normal position at rest. However, while the wedge is in interfering position, spring 128 will be deformed and will thus be storing potential energy. A release of actuator 94 will therefore permit spring 128 to spring back to its natural position, whereupon free end 132 will move to the opposite side of line 142, whereat it will rest in engagement with arm 124 preparatory for the next sequential operation of the actuator. This next sequential operation of the actuator will then cause free end 132 to be displaced in the direction of arrow 144 and will result in a counter-clockwise pivoting of lever 110.

It will be understood that a small displacement of free end 132 from one side of the line 142 to the other will prime the free end for being displaced in one of two directions by wedge 98. The movement of the free end is controlled by arms 120 and 122. The spring 128 stores energy when actuator 94 is depressed and releases this energy when the actuator is released, whereupon the desired displacement of the free end 132 is effected.

It is to be noted in this embodiment, as well as in the embodiment of FIGURES 1–3, that the dead center springs are necessarily stronger than the associated springs which are, for example, arms 36 and 38 in FIGURES 1–3 and 128 in FIGURES 5 and 6. This will enable the dead center springs to perform their functions without interference by the storage devices or springs which the invention employs to store potential energy preparatory to priming the associated mechanism.

It is to be further noted in the embodiments of the invention which have been illustrated that actually only a very small displacement of the parts is required. In FIGURES 1–3, it is simply necessary for the interposed member 42 to move from one side of pivot 28 to the other, and this movement need only be of such magnitude to transfer the interposed member from one lever arm to the other. Similarly, in FIGURES 5 and 6, free end 132 need only move slightly from one side of line 142 to the other.

Attention is also directed to the fact that the invention employs storage devices, such as resilient members, which are deformed upon the operating of an actuator and which release their stored energy upon a release of the actuator.

With regard to the specific structures illustrated, it is to be noted that these have not been presented in great detail since their actual forms are susceptible to many modifications. For example, it is not intended that the actuators 46 and 94 be directly engaged by the hand of an operator or other actuating mechanisms, but rather that these actuators be provided with insulated buttons or like mechanisms which are clearly within the scope of those skilled in the art to provide.

In essence, devices provided in accordance with the invention may be classified as converters. In fact, they convert sequential applications of like forces to different alternatively preformed operations or manifestations. Generally, this is effected by having an actuator and actuatable means responsive to the actuator for performing at least two operations. Further means are provided in accordance with the invention responsive to the actuator and/or the actuatable means for controlling the response of the latter to the actuator. Usually the actuator will be supported for movement along a substantially fixed path.

There will now be obvious to those skilled in the art many variations of the structures set forth. These variations will not, however, depart from the scope of the invention as defined in the following claims.

What is claimed is:

1. Apparatus comprising an actuator, means supporting the actuator for a series of like displacements along a fixed path, each displacement consisting of components in opposite directions, an operating member adapted to assume one of a plurality of operating conditions in response to said actuator, means separated from said actuator and interposed between the actuator and the operating member, said means being adapted for selectively assuming a plurality of predetermined relationships with respect to the operating member so that operation of the actuator results in one of said operating conditions, and means coupled to the operating member for storing potential energy upon displacement of the actuator in one of said directions, the latter said means being coupled to the first said means for controlling the relationship of the latter with respect to the operating member, said latter means being responsive to displacement of the actuator in the other of said directions for releasing potential energy to control the first said means to change its relationship to said operating member.

2. A converter for performing two different functions, alternately and in response to the application of sequential forces, said converter comprising an actuator, means supporting the actuator for like sequential displacements in response to said forces, actuable means adapted for being displaced and performing the different functions, and converter means separate from said actuator and including two elements adapted for being resiliently engaged with each other, one of said elements being operatively associated with said actuable means for displacement thereby and the other of said elements being adjacent said one element and responsive to the same on displacement of said actuable means for selectively assuming different positions, said other element being interposed between the actuator and the actuable means for actuating the latter in response to displacements of the actuator, said other element in its different positions being responsive to a displacement of the actuator for applying one of a plurality of different forces to the actuable means whereby the latter is caused to perform one of said different functions, said other element further being primed by said one element upon displacement of said actuable means for displacement to another of said different positions and thereby the application of another of the different forces to the actuable means upon the next sequential displacement of the actuator.

3. A converter comprising an actuator adapted for being depressed and released, means supporting the actuator and defining a fixed path of movement therefor, actuable means including spaced portions each adapted for receiving a force, the actuable means performing different operations in response to the application of forces to the different spaced portions, and converter means separated from said actuator and including two elements adapted for being resiliently engaged with each other and for storing energy upon a depressing of said actuator, one of said elements being operatively associated with said actuable means for displacement thereby and the other of said elements being adjacent and responsive to said one element on release of said actuator for selectively assuming different positions, said other element being interposed selectively between the actuator and the portions for the transmission of a force to the latter.

4. An electric switch comprising at least one contact, a lever, means pivotally supporting the lever for movement between two positions in at least one of which the lever engages the contact, a lever actuator adapted for being operated and released, means supporting the lever actuator for like sequential displacements, and means independent of said actuator interposed between the actuator and said lever and responsive to operation of the actuator for pivoting the lever from a first of the positions to the second position, the interposed means being primed by the pivoting of the lever and release of said actuator for reversing the pivoting of the lever in response to the next sequential displacement of the actuator.

5. A switch as claimed in claim 4 wherein the actuator comprises a wedge portion tapering substantially to a point, the means supporting the lever including a pivot between the ends of the lever, the point and pivot defining a line, first and second sets of arms on the lever on opposite sides of the line, the interposed means being a cantilever resilient device extending along the lever and between the arms of each set with the free end of the cantilever resilient device being between the arms of the first set whereat the device is engaged by the wedge portion, a pivoting of the lever operating through one of the arms of the second set to engage the resilient device and urge the free end thereof against the arm of the first set which is on the opposite side of the line whereby a subsequent operation of the actuator reverses the pivoting of the lever.

6. A switch as claimed in claim 4 comprising a dead-center spring engaging the lever for maintaining the same in either of the two positions, said spring having greater strength than the resilient device.

7. Switch apparatus comprising an actuator adapted for being depressed and released, a pivotal switch device adapted to be pivoted by said actuator, a member adapted for assuming first and second positions between said actuator and device whereby said actuator upon being depressed is adapted to pivot said device selectively in opposite directions, and a spring operatively associated with said actuator and switch device and adapted to store energy upon a depressing of the actuator and to release energy thus stored upon release of said actuator causing a pivoting of said switch device, said spring being operatively coupled with said member and upon releasing stored energy causing said member to change positions thereby providing for changing the direction of pivot of said device.

References Cited in the file of this patent

UNITED STATES PATENTS

| | | |
|---|---|---|
| 2,044,065 | Douglas | June 16, 1936 |
| 2,508,040 | Ransome | May 16, 1950 |
| 2,668,204 | Tregoning | Feb. 2, 1954 |
| 2,695,524 | Eaton | Nov. 30, 1954 |
| 2,782,279 | Huesser | Feb. 19, 1957 |
| 2,845,498 | Gaynor | July 28, 1958 |
| 2,902,559 | Morris | Sept. 1, 1959 |
| 2,905,785 | Quinn | Sept. 22, 1959 |